US006303166B1

(12) United States Patent
Kolbe et al.

(10) Patent No.: US 6,303,166 B1
(45) Date of Patent: Oct. 16, 2001

(54) CAPACATIVE DIELECTRIC HEATING SYSTEM

(75) Inventors: Edward R. Kolbe, Portland; Jae W. Park, Warrenton; John Henry Wells, Portland; Benjamin A. Flugstad, Bandon; Yanyun Zhao, Corvallis, all of OR (US)

(73) Assignee: The State of Oregon acting by and through the State Board of Higher Education on Behalf of Oregon State University, Corvallis, OR (US)

( * ) Notice: Subject to any disclaimer, the term of this patent is extended or adjusted under 35 U.S.C. 154(b) by 0 days.

(21) Appl. No.: 09/295,666

(22) Filed: Apr. 21, 1999

Related U.S. Application Data
(60) Provisional application No. 60/082,586, filed on Apr. 21, 1998.

(51) Int. Cl.$^7$ .................................................. A23B 6/00
(52) U.S. Cl. .......................................... 426/237; 219/771
(58) Field of Search .......................... 426/237, 230–236, 426/238–243; 219/771, 779, 778, 780; 516/68; 427/131; 313/574

(56) References Cited

U.S. PATENT DOCUMENTS

| 3,945,170 | 3/1976 | Brown . | |
|---|---|---|---|
| 4,230,731 | * 10/1980 | Tyler | 426/233 |
| 4,549,056 | * 10/1985 | Okatsuka et al. | 219/626 |
| 4,775,769 | * 10/1988 | Jones | 219/771 |
| 4,812,609 | * 3/1989 | Butot | 219/771 |
| 5,266,766 | * 11/1993 | Hecox | 219/680 |

OTHER PUBLICATIONS

"The role of active containers in improving Heating performance in microwave ovens" by Kester, R. M., Microwave world, (1986), abstract available only.*

A. L. Koral, *Proctor—Strayfield Magnatube Radio Frequency Tube Heating System*, (undated).
"Drying the Fry," reprinted from *Potato Business World*, (Oct. 1993).
J.H. Houben et al., "Radio–Frequency Pasteurization of Sausage Emulsions as a Continuous Process," *Journal of Microwave Power and Electromagnetic Energy*, vol. 26 No. 4, pp. 202–205 (1991).
J.H. Houben et al, "Continuous Radio Frequency Pasteurization of Sausage Emulsions," *Proc. Trends in Modern Meat Technology, II*, Pudoc Wageningen, The Netherlands, pp. 73–78 (1988).
N.E. Bengtsson et al., "Radio–Frequency Pasteurization of Cured Hams," *Journal of Food Science*, vol. 35, pp. 681–687 (1970).
Radio Frequency Co., *Applications & Benefits of Heating with Macrowave* (1980).
PSC, Inc., *Radio Frequency Veneer Redry with PSC's Dielectric Dryer/Distributor* (undated).
R. Serota, "Heating with Radio Waves," Reprinted from *Automation*, Sep. 1973, pp. 2–6.
*Sadha News*, http://www.index.co.za/sadha/, pp. 1–5 (1997).
"Update on RF Heating," *Food Manufacturing*, pp. 33–34 (undated).

* cited by examiner

Primary Examiner—Teresa Walberg
Assistant Examiner—Quang Van
(74) Attorney, Agent, or Firm—Karlquist Sparkman, LLP

(57) ABSTRACT

A food product is heated by maintaining the food product in an AC electrical field provided by an RF signal at an RF frequency that matches a Debye resonance frequency or frequencies of one or more components of the food product. As the food product warms, the frequency of the RF signal is automatically adjusted to track changes in the Debye resonance frequency, which shifts in frequency as the temperature rises. Individual regions of the food product can be heated, by the use of grid electrodes, at different rates to assure uniform warming or to achieve a particular desired warming pattern.

21 Claims, 5 Drawing Sheets

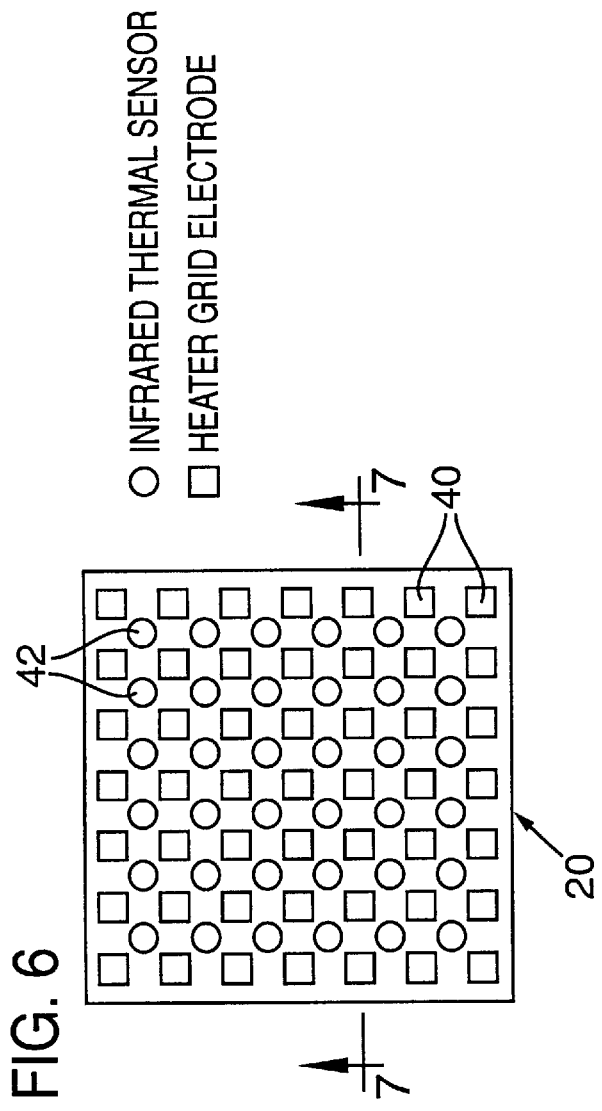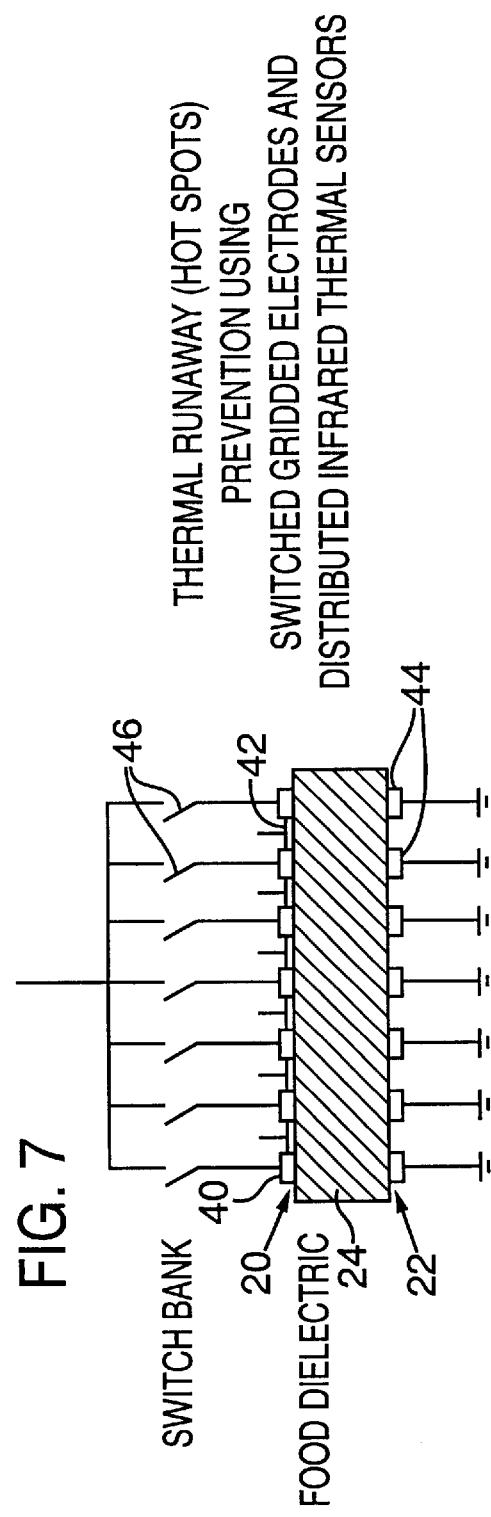

CAPACATIVE DIELECTRIC HEATING SYSTEM

This application claims the benefit of U.S. Provisional Application No. 60/082,586, filed Apr. 21, 1998, incorporated herein by reference.

This invention was made with government support under NOAA (National Oceanic and Atmospheric Administration) Grant No. NA36RGO451. The government has certain rights in the invention.

BACKGROUND AND SUMMARY OF THE INVENTION

This invention pertains to methods and apparatuses for the capacitive radio frequency (RF) dielectric heating of foods.

A variety of different methods are available for the thermal processing of various materials. Heat is supplied by hot water, steam, resistive heating elements, burners, torches, ovens, electrical conduction (ohmic heating), induction heating (magnetic), capacitive heating (dielectric), and electromagnetic radiative heating (resonant ovens, cavities or chambers) and many other heating methods. Applications include sterilization, pasteurization, thawing, melting, curing, drying, bonding (e.g. laminates), welding, brazing, heating for chemical reactions, and many others. Heated materials include ceramics, rubber, plastics (and other polymers), composites, metals, soils, wood and many types of biological materials including food.

An important application of heating technologies is in the area of the pasteurization and sterilization of foods, particularly foods in large-dimensioned packages. Food safety and quality is becoming an increasingly important topic with the many incidents where people have become sick or died due to unkilled microbial populations in food. For example, alfalfa and radish seeds are raw agricultural commodities that can become contaminated with organic material that harbor pathogens such as Salmonella or *E. coli* O157:H7 during growing and harvest. Seed processing and storage procedures are aimed at reducing varietal contamination of seeds through the elimination of weed seeds and foreign matter. Such seed cleaning and certification programs insure varietal purity, but provide no means of food safety intervention for seeds destined for sprouting and consumption as food. As a result, there are increasing reports of microbial outbreaks in sprouted seed products such as radish and alfalfa sprouts. Human salmonellosis (due to Salmonella bacteria) and outbreaks of *E. coli* O157:H7 have been associated with the consumption of alfalfa and radish sprouts in several countries. Alfalfa and radish sprouts, a definitive highly nutritious and perceived healthy food, have been implicated in multi-site outbreaks of foodborne illnesses. Seeds were linked to about 150 confirmed cases of salmonellosis in Oregon and British Columbia in 1996. Also in 1996, radish sprouts were associated with Japan's largest recorded outbreak of *E. coli* O157:H7 infection with an estimated 11,000 cases that led to eleven deaths. In June and July 1997, simultaneous outbreaks of *E. coli* O157:H7 infections in Michigan and Virginia were independently associated with eating alfalfa sprouts grown from the same seed lot. A total of 60 people with *E. coli* O157:H7 infection were reported to the Michigan Department of Community Health and 48 cases reported to the Virginia Department of Health. Recently, the California Department of Health Services identified six cases of *E. coli* O157:NM with illness onsets from June 16 through Jun. 27, 1998, caused by eating an alfalfa-clover sprout mixture.

The lack of standardization in required heating time/temperature relationships to insure food product safety is also attracting more focus. In addition, food quality or taste/texture issues are important in our selective consumer oriented society. Therefore there is a need for a heating technology that will achieve the desired microbial kill rates uniformly over that whole food product in a reasonable amount of time without altering or degrading the overall quality of the food.

In the seafood industry, for example, existing heating technologies for the pasteurization of seafoods employ either hot water or steam, sometimes in combination with gas preheaters. These technologies have several limitations including reliance on thermal conduction from the product surface (resulting in non-uniform heating), slow heating rates (especially in the product center), large floor space requirements, poor overall energy efficiency, generation of large amounts of waste water and limitations on the product geometry (i.e., need to be thin or flat).

Capacitive RF dielectric heating is used in several industries. They include the drying of various wood and sawdust products in the timber industry, preheating and final drying of paper, drying of textiles, drying of glass fibers and spools, drying water-based glues in the paper-cardboard industry, drying pharmaceutical products, welding plastics, sealing, preheating plastics prior to forming, firing foundry cores in casting, polymerization of fiber panels, gluing of woods such as laminated plywood, printing and marking in the textile, leatherware and shoe industries, melting honey, heating rubber prior to vulcanization, welding glass formed sections, bonding multi-layer glass products, drying of powders, drying leathers and hides, curing of epoxy, curing of plastisol, curing of brake linings, impregnating resins, thermosetting adhesives, curing hardboard and particle board, and many other applications.

The use of capacitive (RF) dielectric heating methods for the pasteurization and sterilization of foods offer several advantages over non-electromagnetic heating methods. These include rapid heating, near independence of the thermal conductivity of the medium (i.e. heat internal portions of medium directly), high energy efficiency, good heating even in the absence of DC electrical conductivity, high energy densities, reduced production floor space, and easy adaptation to automated production batch and/or continuous flow processing.

Another application of this technology is in the thawing of frozen foods. Common thawing applications again rely on the thermal conduction of heat from the surface to the interior to provide thawing. Due to freshness and product quality constraints thawing often is done by immersion in water baths that are only slightly above freezing themselves or in refrigerators set to slightly above freezing (e.g. 35–40° F.). Thawing times are often very long and can be overnight. With capacitive heating teclmologies, that heat over the entire volume uniformly, thawing can be performed much more rapidly.

Capacitive (RF) dielectric heating differs from higher frequency electromagnetic radiative dielectric heating (e.g. microwave ovens) in that with capacitive heating the wavelength of the chosen frequency is large compared to the dimensions of the sample being heated whereas with electromagnetic radiative heating the wavelength is comparable or even small compared to the dimensions of the sample being heated. An example of capacitive heating is two large parallel electrodes placed on opposite sides of a wood sample with an AC displacement current flowing through it to heat and dry the wood. An example of electromagnetic radiative heating is a metal chamber with resonant electromagnetic standing wave modes such as a microwave oven. Capacitive heating also differs from lower frequency ohmic heating in that capacitive heating depends on dielectric losses and ohmic heating relies on direct ohmic conduction losses in a medium and requires the electrodes to contact the medium directly (i.e. can not penetrate a plastic package or air gap).

Capacitive (RF) dielectric heating methods offer advantages over other electromagnetic heating methods. For example, capacitive (RF) dielectric heating methods offer more uniform heating over the sample geometry than higher frequency radiative dielectric heating methods (e.g. microwave ovens) due to superior or deeper wave penetration into the sample as well as simple uniform field patterns (as opposed to the complex non-uniform standing wave patterns in a microwave oven). In addition capacitive (RF) dielectric heating methods operate at frequencies low enough to use standard power grid tubes that are both lower cost (for a given power level) as well as allow for generally much higher power generation levels than microwave tubes. Capacitive (RF) dielectric heating methods also offer advantages over low frequency ohmic heating. These include the ability to heat a medium that is enclosed inside an insulating plastic package and perhaps surrounded by an air or de-ionized water barrier (i.e. the electrodes do not have to contact the media directly). The performance of capacitive heating is therefore also less dependent on the product making a smooth contact to the electrodes. Capacitive (RF) dielectric heating methods are not dependent on the presence of DC electrical conductivity and can heat insulators as long as they contain polar dielectric molecules that can partially rotate and create dielectric losses. A typical existing design for a capacitive dielectric heating system is described in Orfeuil, M. 1987. *Electric Process Heating: Technologies/Equipment/Applications*. Columbus: Battelle Press.

Capacitive (RF) heating devices have been used in the food industry, but the reported energy efficiency has been low and heating has not always been uniform. Proctor Strayfield has developed a magnatube pasteurization system (Koral, A. L., 1990. *Proctor-Strayfield Magnatube Radio Frequency Tube Heating System*. Proctor Strayfield, A Division of Proctor & Schwartz, Inc.) that has been demonstrated to be successful in the cooking/sterilization of scrambled eggs as well as in the creation of a "skinless" meatloaf from a pumped slurry using a vertical tube system. Houben et. al of the Netherlands (Houben, J., Schoenmakers, L., van Putten, E., van Roon, P. and Krol, B. 1991. Radio-frequency pasteurization of sausage emulsions as a continuous process. J. Microwave Power & Electromagnetic Energy. 26(4): 202–205.) in 1991 showed that sausage emulsions could be successfully pasteurized using RF heating. Bengtsson et al of Sweden (Bengtsson, N. E., and W. Green. 1970. Radio-Frequency Pasteurization of Cured Hams. *Journal of Food Science*. V35: 681–687) in 1970 demonstrated that cured hams could be pasteurized successfully by RF heating. RF heating feasibility experiments were conducted on packaged and unpackaged surimi seafood samples at a test facility of PSC, Inc. of Cleveland, Ohio (Kolbe, Kolbe, E. 1996. Heating of packaged surimi seafoods in a commercial RF oven. Unpublished information. OSU Dept. of Bioresource Engineering.). The test system was a high power single-frequency capacitive heater set at 18 MHz. Tests on samples placed between parallel electrodes showed that when properly oriented, surimi seafoods could be heated to pasteurization temperatures (85° C.) in less than 10 minutes. The results also showed, however, that packaging can be a complicating factor. For example, small amounts of food trapped in the packaging seams can cause rapid local heating and burning.

Some prior work in the area of dielectric heating has been conducted on seed germination enhancement effects. The possibility of utilizing dielectric energy for stimulating or improving the germination and growth of seeds and for controlling insects has been variously considered for the last forty years (Nelson, S. O. and Walker, E. R. 1961, "Effects of radio-frequency electrical seed treatment," *Agricul. Eng.* 42(12): 688–691; Nelson, S. O. 1976, "Use of microwave and lower power frequency RF energy for improving alfalfa seed germination," J. Microwave Power 12(1):67–72; Nelson, S. O. 1996, "Review and assessment of radio-frequency and microwave energy for stroed-grain insect control," *Transactions of the ASAE*. 39(4):1475–1484.). Reported effects ranged from accelerated germination and early growth and the killing of fusarium spores to early flowering and high yields of plants grown from treated seeds. Nelson and Walker (1961) reported that brief exposure of alfalfa containing considerable hard seed shells to electrical fields has been highly successful in reducing the head-seed percentages and producing a corresponding increase in normal seedling germination. Also, benefits from electric treatment have been shown in alfalfa seeds for up to 21 years in storage with no evidence of any short or long term detrimental effects (Nelson, 1961, 1976). Nelson (1976) found that the moisture content of seeds at the time of treatment influenced the degree of response. Generally seeds of lower moisture content responded more favorably to treatment than high moisture content seeds. The final temperature of seeds treated at any given moisture content seemed to be a good indicator of the degree of favorable response. Some work has been done using higher frequency microwave heating for the treatment of seeds. Cavalcante et al. (Cavalcante, M. J. B. and Muchovej, J. J. 1993, "Microwave irradiation of seeds and selected fungal spores," *Seed Sci. & Technol.* 21:247–253) investigated the use of microwave irradiation on seeds and its effects on the control of selected fungal spores.

Some work has been done to characterize the dielectric properties of food and packaging materials. There is preliminary data at lower frequencies for polymers to show temperature dependent Debye resonance effects (Malik, T. M., R. E. Prud' Homme. 1984. Dielectric Properties of Poly($\alpha$-Methyl-$\alpha$-N-Propyl-$\beta$-Propiolactone)/Poly(Vinyl Chloride) Blends. *Polymer Engineering and Science.* v24, n2 p144–152; Scarpa, P. C. N., Svatik, A. and Das-Gupta, D. K. 1996. Dielectric spectroscopy of polyethylene in the frequency range of $10^{-5}$ Hz to $10^6$ Hz. Polymer Eng. & Sci. 36(8): 1072–1080). And, for food in the medium frequency ranges, limited tabulated data exists (Von Hippel, A. R., 1954. *Dielectric Materials and Applications*. MIT Press; Kent, M. 1987. Electrical and Dielectric properties of food materials. Science and Technology Publishers, England; Mudgett, R. E. 1985. Electrical Properties of Foods. In *Microwaves in the Food Processing Industry*, R. V. Decareau (Ed.). New York: Academic Press; Pethig, R. 1979. *Dielectric and Electronic Properties of Biological Materials*. Chichester: John Wiley & Sons, Inc.; Tinga, W. R. and S. O. Nelson. 1973. Dielectric Properties of Materials for Microwave Processing-Tabulated. *J. of Microwave Power*. 8:1–65; Tran, V. N. and Stuchly, S. S. 1987. Dielectric properties of beef, beef liver, chicken and salmon at frequencies from 100 to 2500 MHz. J. Microwave Power. 29–33). Most data for food has been collected at higher frequencies (>100 MHz) and tied closely to the dielectric behavior of the water in the medium, for applications toward microwave ovens.

A specific disadvantage of capacitive (RF) dielectric heating methods include the potential for thermal runaway or hot spots in a heterogeneous medium since the dielectric losses are often strong functions of temperature (e.g., small pockets of a lossy dielectric food material, for example a small thermal mass trapped in the seams of a package, may heat rapidly and could burn itself and the melt the package). Another disadvantage of capacitive heating is the potential for dielectric breakdown (arcing) if the electric field strengths are too high across the sample (necessitating compensating air gaps or a thicker sample).

The use of edible films to extend shelf life of food products and protect them from harmful environmental effects has been emphasized in the recent years. Interests and research activities in edible films have been especially intense over the past ten years. Edible films are very promising systems for the future improvement of food quality and preservation during processes and storage. Indeed, edible films can be used where plastic packaging cannot be applied. For example, they can separa te seve ral compartments within a food. Although edible films are not meant to totally replace synthetic films, they do have the potential to reduce packaging and to limit moisture, aroma, and lipid migration between food components where traditional packaging cannot function.

An edible film is defined as a thin layer of one or more edible materials formed on a food as a coating or plaed (pre-formed) on or between food components. Most edible films are natural polymers obtained from agricultural products such as animal and vegetable proteins, gums, and lipid and are perfectly biodegradable and usually water soluble. The general materials that are used to manufacture edible films are cellulose ethers, starch, corn zein, wheat gluten, soy proteins and milk protein. Examples include methyl cellulose (MC), hydroxypropyl cellulose (HPC), Sodium and Calcium Caseinates (SC or CC), and whey protein concentrates (WPC).

The performance of edible packaging is comparable to that of traditional synthetic polymer films with respect to mechanical strength, barrier properties, and compatibility. Applications of edible packaging include its use in inhibiting migration of moisture, oxygen, carbon dioxide, aromas, and lipids, etc. within composite foods; carrying food ingredients (e.g, antioxidants, antimicrobials, flavor); and/or improving mechanical integrity or handling characteristics of the foods.

Moisture transport through polymer films is influenced by several polymer properties including chemical structure, method of polymer preparation, polymer processing condition, free volume, density, crystallinity, polarity, tacticity, crosslinking and grafting, orientation, presence of additives, and use of polymer blends. An increase in crystallinity, density, orientation, molecular weight or crosslinking results in decreased permeability of edible films.

Although capacitive (RF) dielectric heating systems have been used for heating foods in the past, there remains a need for improved methods and apparatuses to rapidly, efficiently and uniformly heat food products or parts of food products.

It has now been discovered that certain capacitive (RF) dielectric heating devices and/or methods can be used to rapidly, efficiently and/or uniformly heat foods, including unsprouted seeds and sprouts, for pasteurization, sterilization and/or thawing.

The performance of capacitive (RF) dielectric heating methods is highly dependent on the dielectric properties of the materials being heated. Optimal heating is obtained by matching the frequency of the RF energy input to the dielectric properties of particular food products to be heated. For example, the frequency of the AC displacement current can be chosen to heat muscle tissues in a food product, instead of just the water that is heated in a microwave heating process. Potential thermal runaway problems are thus avoided.

The energy efficiency and/or heating rate are maximized at or near the location in frequency of a "Debye resonance" of the material to be heated. Thus, in the heating system of the present invention, the RF signal frequency is tuned to the optimal Debye frequency or frequencies of a component or components of the food product to be heated. Multiple Debye resonances may occur in a composite material. So, multiple composite frequency groups can be applied to handle the several Debye resonances. Also, the RF signal frequencies can be varied with temperature to track Debye frequency shifts with changes in temperature.

Characterization of dielectric properties vs. frequency and temperature is thus a first step to the design of a capacitive (RF) dielectric heating system to pasteurize, sterilize or thaw various foods by the method of the present invention. It is usually desired to heat food without any noticeable degradation in quality, texture or taste. Thus, to aid in the selection of appropriate operating conditions, food samples are studied to assess the effects of RF energy on key properties of the food samples at various frequencies and temperatures. The results of these studies influence the design of capacitive dielectric heating systems according to the present invention.

In addition, a capacitive dielectric heater may be called on to heat a food product contained in packaging materials. Some packaging materials will degrade if overheated, whereas other packaging materials can be heated intentionally to transfer heat energy to a food product contained in the packaging. Therefore the characterization of the dielectric properties of packaging materials and the effects of RF energy on those materials may be important in choosing the proper packaging materials and/or operating frequencies.

An electromagnetic/heat transfer mathematical model can be used to predict the dielectric heating characteristics of various foods and packaging materials. Such a model may involve 2-D and/or 3-D mathematical modeling programs as well as finite element methodologies to model composite materials. Best results are achieved with a model that integrates both electromagnetic and heat transfer principles.

To supply the AC displacement current at a needed frequency, variable components in a tunable RF signal generator circuit and associated matching networks are actively tuned to change frequency, or tuned automatically, or switched with a control system. Therefore a software control system is also provided to set up the frequency profile. A variable frequency synthesizer and a broadband power amplifier and associated matching systems and electrodes are useful components of a medium energy version of such a capacitive dielectric heating system according to the present invention. Temperature monitoring of the heated medium using thermal sensors or infrared scanners is conducted and data fed back into the control system and the generator's frequency groups swept accordingly to track the Debye shifts with temperature.

With the methods and apparatuses of the present invention it is possible to avoid the potential disadvantages of capacitive (RF) dielectric heating methods mentioned above. In particular, the potential limitations are addressed by providing frequency control to match Debye resonances of the dominant constituents of the medium, track them with temperature, control field strengths and optimize product geometries to prevent arcing. Packaging methodologies can be used to keep food out of seams to avoid heating the seams. And, the electrode system may be constructed to lower the field strengths on the packaging seams. To prevent or reduce the risk of thermal runaway, a gridded electrode system can be used with an infrared scanner to monitor the entire body of a food product being heated. In response to signals from the scanner, individual components of the food product can be independently heated by adjusting local field strengths or by switching some portions of the grid off in different duty cycles to prevent "hot spots".

Capacitive (RF) dielectric heating systems according to the present invention offer numerous advantages over hot water and steam heating (for pasteurization or sterilization) and cold water thawing technologies and other heating technologies.

By certain processes of the present invention, it is possible to obtain uniform heating over the entire volume of a food product. This technology heats the polar dielectric molecules evenly and directly over the entire volume of the sample as opposed to hot water and steam heating or cold water thawing technologies that rely on thermal conduction from the surface of the medium. Capacitive (RF) dielectric heating offers more uniformity than higher frequency microwave ovens due to the lower RF frequency range which, for the purpose of this disclosure, is defined as being about 300KHz to 300 MHz, and preferably 1 MHz–100 MHz, allowing for deeper penetration into saline media as well as the fact that the media is small compared with a wavelength and so capacitive heating does not rely on the complex wave propagation and reflection modes required in a microwave oven. The field patterns are generally simple 2-D patterns between parallel plates again resulting in more uniformity in heating.

Heating to pasteurization and sterilization temperatures can be rapid, resulting in lower degradation to food quality (e.g. protease enzyme in seafoods inactivated). The rapid heating capability is due to the same uniform heating advantage described above and by the matching of generator frequency or composite of frequencies to the Debye resonance frequency groups of the various food media and/or packaging, and tracking those Debye resonance frequency groups with temperature. Power control capability of the generator/heating system allows for the ability to set heating rates to optimize heating processes. Production floor space may also be reduced due to increased throughput rates.

Higher overall energy efficiency is obtained by matching the generator frequency or composite of frequencies of the RF signal to the Debye resonance frequency groups of the various food media and tracking those resonances with temperature resulting in a shorter heating time per unit volume for a given energy input.

Complete control of the heating process is achieved by the selective heating of various constituents of the food medium and/or packaging material. Protein molecules contain peptide chains with amino-acid side groups that often are polar. In addition various hydrated interfaces (bound water) of complex tissue molecules can also be polar. This technology can be set up to target the Debye resonances of those constituents of food for which heating is desired and avoid the Debye resonances of other constituents (e.g. packaging materials) of which heating is not desired by setting the generator frequency or frequency groups of the RF signal to target the appropriate Debye resonances and track them with temperature and avoid other Debye resonances.

Capacitive (RF) dielectric heating will heat a food sample even when packaged in a thermal and electrical insulator as well as if the sample is thick and unusually shaped due to the fact that the internal polar molecules are being heated and again therefore no reliance on thermal conduction from the surface. Hot water and steam technologies require flat geometries with very thin packaging or insulating layers.

Capacitive (RF) dielectric heating of food is a clean process with no generation of wastewater.

Heating rates can be increased by the matching of the generator frequency or composite of frequencies of the RF signal to the Debye resonance frequency groups of the various heated media and tracking those Debye resonance frequency groups with temperature.

Overall energy efficiency is improved due again to the matching of the generator frequency or composite of frequencies to the Debye resonance frequency groups of the various heated media and tracking those Debye resonance frequency groups with temperature. Efficiency is also improved by selective heating of the various individual constituents of a medium (e.g. glue between layers of plastic packaging laminates) by targeting the Debye resonance profiles of those constituents and setting up the generator to excite them and track them with temperature.

One appropriate use of capacitive (RF) dielectric heating is for the sterilization and/or pasteurization of seeds packaged in edible films or alternatively standard polymer films. The technology may also be useful to improve or enhance the germination rates of seeds through the pretreatment of seeds prior to planting and sprouting with capacitive (RF) dielectric heating. The warming and softening of seed shells as well as the control or reduction/elimination of germination inhibiting microorganisms are the two primary methods of improving germination rates when using capacitive (RF) heating technology as a pre-germination seed treatment process.

BRIEF DESCRIPTION OF THE DRAWINGS

In the drawings:

FIG. 6 is a top plan view of a grid electrode according to the present invention, which may be used in the system of FIG. 5;

FIG. 7 is a sectional view taken along line 7—7 of FIG. 6; and

DETAILED DESCRIPTION

Figure 1:
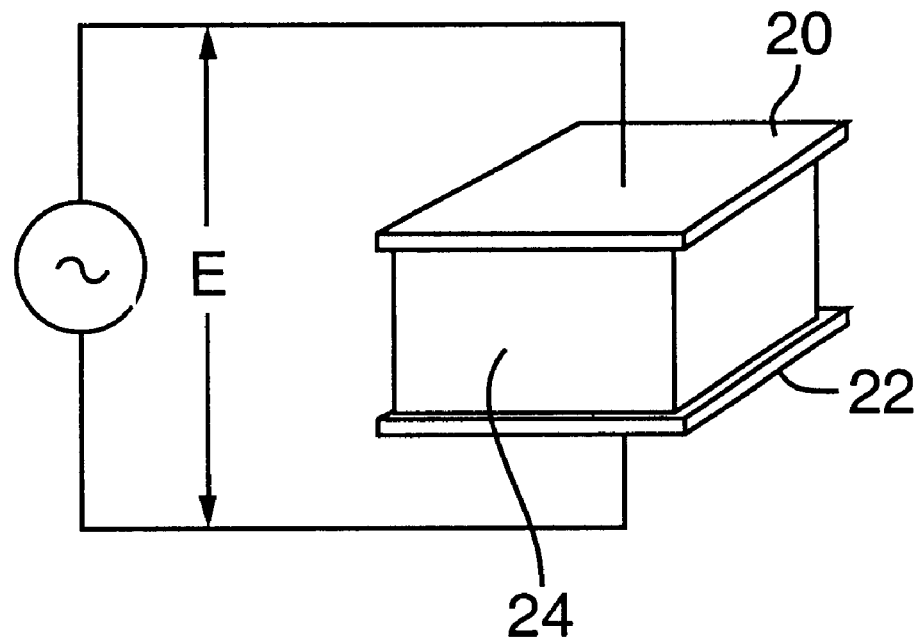
FIG. 1 is a schematic diagram of an existing capacitive (RF) dielectric heating system.

FIGS. 1–4 show an example of a known capacitive (RF) dielectric heating system. A high voltage RF frequency AC signal is applied to a set of parallel electrodes 20, 22 on opposite sides of a dielectric 24 as shown in FIG. 1. A medium 24 to be heated is sandwiched or placed between the electrodes 20, 22 so that an AC displacement current flows through the medium 24 as a result of polar molecules in the medium aligning and rotating in opposite fashion to the applied AC electric field. Direct conduction does not occur but instead an effective AC current flows through the capacitor due to polar molecules with effective charges rotating back and forth. Heating occurs because these polar molecules encounter interactions with neighboring molecules resulting in lattice and frictional losses as they rotate.

Figure 2:
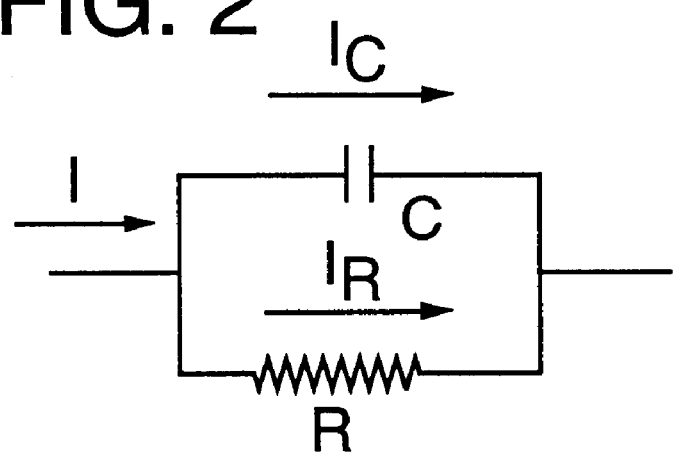
FIG. 2 is an equivalent circuit diagram of the dielectric heating system of FIG. 1.

The resultant electrical equivalent circuit of the device of FIG. 1 is therefore a capacitor in parallel with a resistor as shown in FIG. 2. There is an in-phase $I_R$ and out of phase $I_C$ component of the current relative to the applied RF signal and the in-phase component corresponds to the resistive voltage loss. These losses get higher as the frequency of the applied signal is increased due to higher speed interactions with the neighboring molecules. The higher the frequency of the alternating field the greater the energy imparted into the medium 24 until the frequency is so high that the rotating molecules can no longer keep up with the external field due to lattice limitations. The frequency at which that occurs is modeled by what is called a "Debye resonance" (named after the mathematician who modeled them) and is the frequency at which the maximum energy can be imparted into a medium for a given electric field strength (and therefore the maximum heating). This high frequency limitation is inversely proportional to the complexity of the polar molecule. For example, proteins with amino acid polar side groups or chains have a slower rotation limitation, and thus lower Debye resonance, than simple polar water molecules. These Debye resonance frequencies also shift with temperature as the medium 24 is heated. Finally most food media are composites of many materials and so they may contain several different Debye resonance frequencies.

Figure 3:
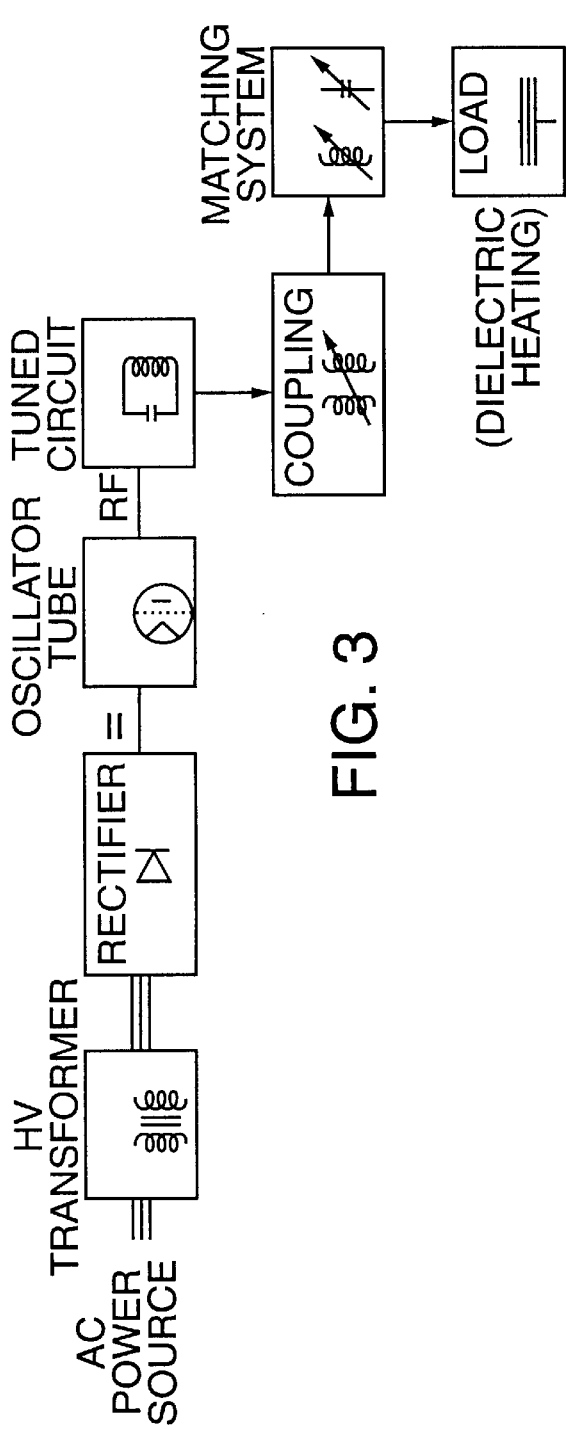
FIG. 3 is a block diagram of the dielectric heating system of FIG. 1.
Figure 4:
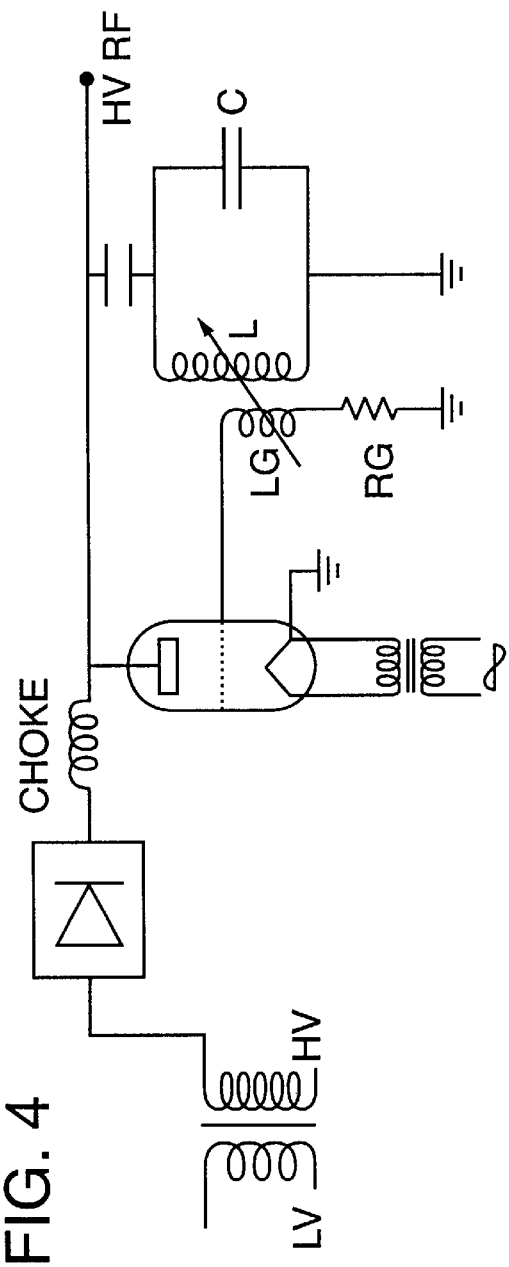
FIG. 4 is a block diagram showing the high power RF signal generation section of the dielectric heating system of FIG. 3 in greater detail.

As shown in FIGS. 3 and 4, a high voltage transformer/rectifier combination provides a high rectified positive voltage (5 kV to 15 kV) to the anode of a standard triode power oscillator tube. A tuned circuit (parallel inductor and capacitor tank circuit) is connected between the anode and grounded cathode of such tube as shown in FIG. 4, and also is part of a positive feedback circuit inductively coupled from the cathode to the grid of the tube to enable oscillation thereby generating the RF signal. This RF signal generator circuit output then goes to the capacitive dielectric heating load through an adapter network consisting of a coupling circuit and a matching system to match the impedance of the load and maximize heating power delivery to the load, as shown in FIG. 3. An applicator includes an electrode system that delivers the RF energy to the load or medium 24 to be heated, as shown in FIG. 1.

Figure 5:
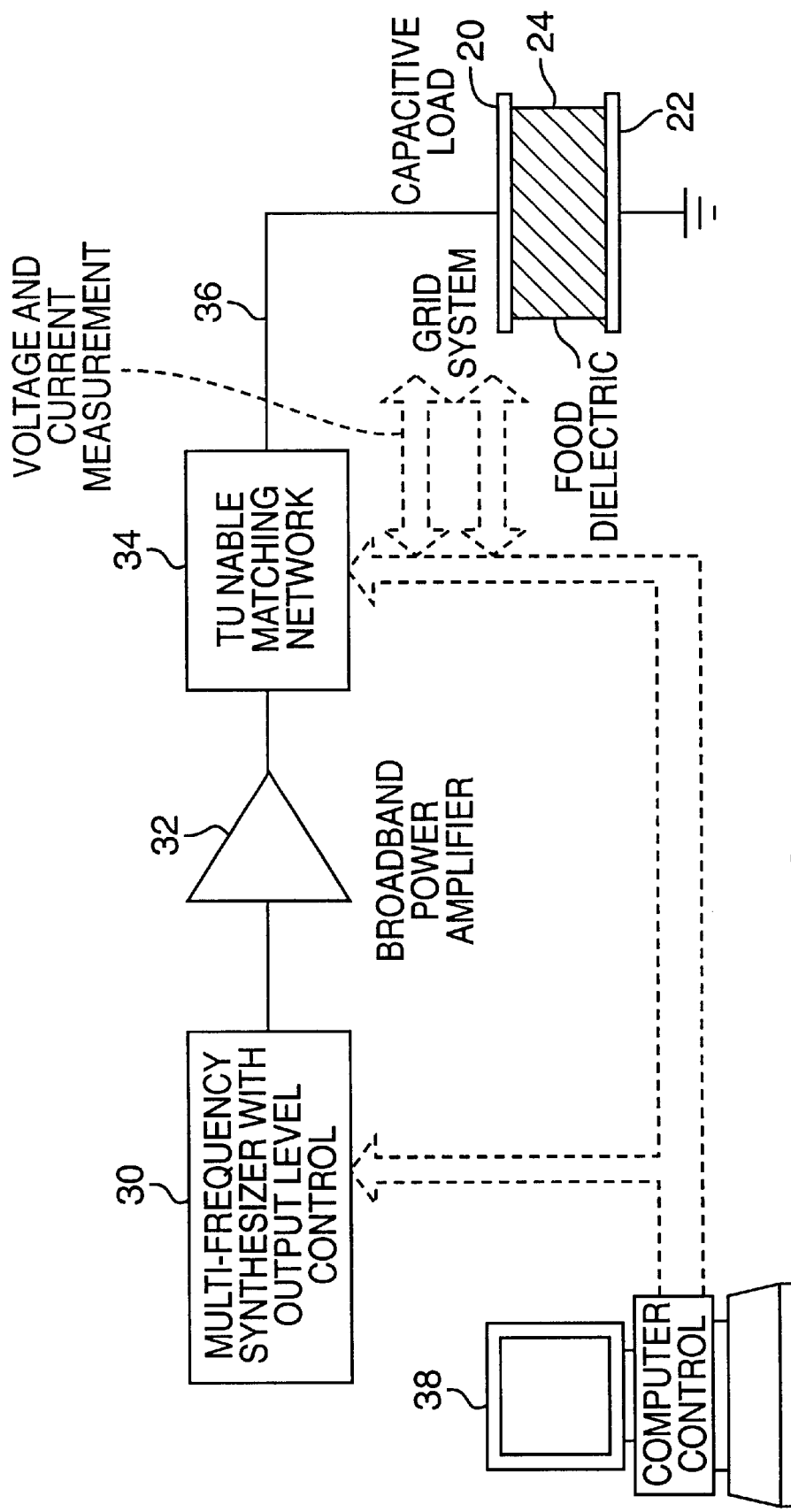
FIG. 5 is a block diagram of a capacitive (RF) dielectric heating system according to the present invention.
Figure 8A:
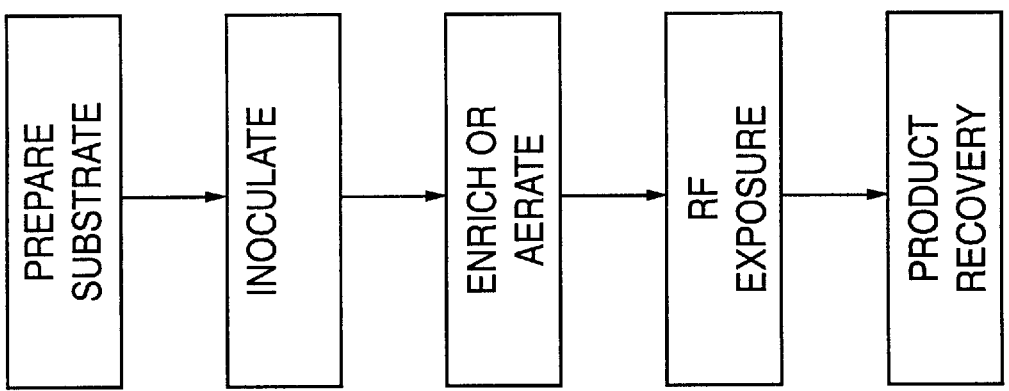
FIGS. 8A–8D are block diagrams of four manufacturing process flows which benefit from use of a dielectric heating system according to the present invention.
Figure 8B:
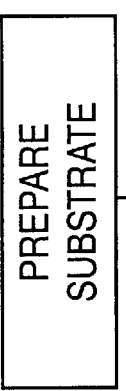
Figure 8C:
Figure 8D:
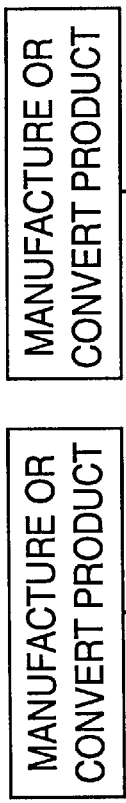

A preferred embodiment of the present invention, shown in FIG. 5, includes a variable RF frequency signal generator 30 with output voltage level control, a broadband linear power amplifier 32, and a tunable impedance-matching network 34 (for variable frequency operation) to match the power amplifier output impedance to the load impedance of the capacitive load 20, 22, 24, that includes the medium 24 being heated.

The system is constructed to provide an AC RF signal displacement current 36 at an RF frequency in the range of 300 KHz to 300 MHz. This range includes the MF (300 KHz to 3 MHz), HF (3 MHz to 30 MHz), and VHF (30 MHz to 300 MHz) frequencies in the lower regions of the radio frequency (RF) range. Superior results are achieved by operating in the frequency range of 1 MHz–100 MHz.

The RF frequency or composite signal of several RF frequencies are selected to correlate with the dominant Debye resonance frequency groups of the medium 24 that is being heated. These Debye resonances are dependent on the polar molecular makeup of the medium 24 and thus are researched for different types of food to appropriately program the heating system. The generation system is capable of more than one frequency simultaneously. The control system for this heating system is capable of being set up or calibrated to be optimum for different types of food or other media.

The frequency or composite frequency groups of the RF signal used in the heating system will track with and change with temperature to account for the fact that the Debye resonance frequencies of the polar molecular constituents of the food or other medium 24 also shift with temperature.

With the most preferred apparatuses according to the present invention, the RF signal power level and electric field strength can be adjusted automatically by a computer control system which changes the load current to control heating rates and account for different food geometries and packaging types. The power level is controlled by measuring the current and field strength across the load. The voltage (AC field strength) is then adjusted, which in turn varies the current, until measurements of the current and field strength indicate that the desired power level has been achieved. As shown in FIG. 5, the computer also controls the multifrequency RF signal synthesizer 30 to change its frequency and to adjust the tunable matching network 34.

As shown in FIGS. 6–7, the system of FIG. 5 can employ gridded heating electrodes on the capacitive load for precise control of heating of the food medium 24 by the computer 38. At least one of the electrodes, for example top electrode 20 in the embodiment of FIGS. 6–7, has a plurality of electrically-isolated electrode elements 40. The bottom electrode 22 also has multiple electrically-isolated electrode elements 44. Most favorably, each top electrode element 40 is located directly opposite a corresponding bottom electrode element 44 on the other electrode. A plurality of switches 46, under control of the computer 38, are provided to selectively turn the flow of current on and off between opposing pairs of electrode elements 40, 44. And/or, an individual computer-controlled variable resistor (not shown) can be included in the circuit of each electrode pair, connected in parallel with the load, to separately regulate the current flowing between the elements of each pair. These arrangements provide the ability to heat individual areas of a food product at different rates than others and to protect against thermal runaway or "hot spots" by switching out different electrode element pairs for moments of time or possible providing different field strengths to different portions of the sample.

It is also advantageous to provide one or more heat sensors on at least one of the electrodes 20, 22. FIGS. 6–7 show a compact arrangement where multiple spaced heat sensors 42 are interspersed between the electrode elements 40 of the top electrode 20. The thermal sensors 42 acquire data about the temperatures of the food sample 24 at multiple locations, which data is sent as input signal to the computer 38. The computer uses the data from each sensor to calculate any needed adjustment to the frequency and power level of the current flowing between pairs of electrode elements located near the sensor and produces corresponding output control signals which are applied to the RF signal generator 30, network 34, variable resistor (not shown), and switches 46.

The electrodes should be made of an electrically conductive material, such as stainless steel or gold, that is suitable for use in a food processing apparatus. The electrodes can take a variety of shapes depending on the shape and nature of the food product to be processed and its packaging. A goal in choosing the shape of the electrodes is to conform the shape of the electrodes to the shape of the item to be processed, so as to minimize air gaps. Although FIGS. 6–7 show a preferred embodiment of the electrodes according to the invention; other arrangements of electrode elements and sensors could be used with similar results or for special purposes.

To design satisfactory packaging materials for food to be heated by a capacitive (RF) dielectric heating system according to the present invention, it best to consider factors such as field voltages, frequency schedules, geometries, and surrounding media. In particular, it is helpful to have a full understanding of dielectric properties of packaging materials and the food product to be heated, over a range of frequencies and temperatures. And, it is important to avoid any factors that may cause high local intensities of field strength, such as moisture accumulation on the corner of vacuum packages, because water has a much higher dielectric loss factor than other components of the food. The capacitive (RF) dielectric heating system of the present invention is particularly useful to heat food products inside packaging that comprises multiple polymers having different properties at different stages in the food processing flow. It is possible to select packaging materials which are essentially transparent to the RF energy at certain frequencies in the 1 MHz–100 MHz range, so that heating of the food can be accomplished without injuring the packaging.

Multiple design methodologies can be used to take advantage of the sealing and preservation characteristics of certain plastic polymers used in combination with plastic polymer components that are RF insensitive. A multiple-staged process could occur where the product is packaged first with RF insensitive materials and then run through the capacitive (RF) heating pasteurization process and then in turn packaged with another layer of a different polymer that has better sealing or preservation characteristics. A variety of sealing and bonding methods can be used for laminated plastic packaging materials. Packaging materials can be chosen or modified to make bonding agents or bonding zones of laminated plastics more insensitive to the effects of RF exposure.

The product to be heated can be surrounded with a non-conductive dielectric coupling medium (e.g. de-ionized water) that itself will not be heated (Debye resonance at much higher frequency) but will increase the dielectric constant of the gaps between the electrodes and the medium to be heated thus improving energy transfer to the medium.

The characterization of the dielectric properties of food as a function of frequency and temperature and the search for Debye resonances of the various food constituents are of great interest. If sufficient information is available, the heating apparatus can be programmed with great precision. Such information can be obtained by conducting preliminary experiments on food products of the type to be heated.

The key electromagnetic parameters of a medium to be tested are defined as follows:

| | |
|---|---|
| $\sigma$ = Electrical Conductivity (S/m) | E = RMS Electric Field Intensity (V/m) |
| $\epsilon$ = Electric Permittivity (F/m) | H = RMS Magnetic Field Intensity (A/m) |
| $\mu$ = Magnetic Permeability (H/m) | B = Magnetic Flux Density (W/m$^2$) |

The Permittivity and permeability can be divided into loss terms as follows:

$$\varepsilon = \varepsilon' - j\varepsilon'' \tag{1}$$

$$\mu = \mu' - j\mu'' \tag{2}$$

where $j = \sqrt{-1}$ $f$ = Frequency (Hz)

$\varepsilon'$ = Energy Storage Term of the Permittivity $\varepsilon''$ = Loss Term of the Permittivity $\mu'$ = Energy Storage Term of the Permeability $\mu''$ = Loss Term of the Permeability When analyzing the experimental data, the magnetic losses can be assumed equal to zero and for the most part frequency can be assumed high enough that the dielectric loss factor $\epsilon''$ dominates over losses due to electrical conductivity $\sigma$ (i.e. where $\omega\epsilon'' >> \sigma$, with $\omega=2\pi f$). The electrical conductivity $\sigma$ is measured and accounted for where needed (mainly at the lower end of the frequency range). With those assumptions in mind, the expressions for equivalent capacitance and equivalent resistance in FIG. 2 reduce to the following:

$$C = (\varepsilon' S)/d \tag{3}$$

$$R = d/(\omega \varepsilon'' S) \tag{4}$$

As mentioned above, capacitive heating systems according to the present invention operate at frequencies in the Medium Frequency (MF: 300 kHz–3 MHz) and/or High Frequency (HF: 3 MHz–30 MHz) bands and sometimes stretch into the lower portions of the Very High Frequency (VHF: 30 MHz–300 MHz) band, but with the high end limit of 100 MHz. The frequency is generally low enough that the assumption can be made that the wavelength of operation is much larger than the dimensions of the food medium, thus resulting in highly uniform parallel electric field lines of force across the food medium.

Following are examples that describe how to devise particular apparatuses, data tables, algorithms and operating procedures.

EXAMPLE 1

Tests can be conducted to measure and characterize dielectric properties, including Debye resonances, of various constituents of muscle foods and potential packaging materials, as functions of frequency (100 Hz–100 MHz) and temperature (0–90° C.).

The experiments are to measure the impedance (parallel capacitor and resistor model) of muscle food samples, and potential packaging materials sandwiched in a parallel electrode test fixture placed within a temperature/humidity chamber. The equipment used for these experiments is as follows:

HP 4194A: 100 Hz–100 MHz Impedance/Gain-Phase Analyzer

HP 41941A: 10 kHz–100 MHz RF Current/Voltage Impedance Probe

HP 16451B: 10 mm, 100 Hz–15 MHz Dielectric Test Fixture for 4-Terminal Bridge

HP 16453A: 3 mm, 100 Hz–100 MHz RF/High Temperature Dielectric Test Fixture

Dielectric 9mm, 100 Hz–1 MHz* Sealed High Temperature Food/Semi-Solids Products Co. LD3T* Liquid-Tight Capacitive Dielectric Test Fixture HP 16085B: Adapter to mate HP16453A to HP 4194A 4-Terminal Impedance Bridge Port (40 MHz)

HP 16099A: Adapter to mate HP16453A to HP 4194A RF IV Port (100 MHz)

Temperature/Humidity Chamber Thermotron Computer Controlled Temperature/Humidity Chamber −68–+177° C., 10%–98% RH, with LN2 Boost for cooling

* The LD3T by Dielectric Products Co. has been used successfully to 10 MHz and higher by various companies but is only tested to 1 MHz by the manufacturer and hence the 1 MHz specification. Dielectric Products will design for us a cabling/connector interface (APC-7 similar to HP 16453 A) to allow for a 100 MHz bandwidth for the fixture.

Each of the capacitive dielectric test fixtures is equipped with a precision micrometer for measuring the thickness of the sample, critical in calculating the dielectric properties from the measured impedance. The different test fixtures allow for trading off between impedance measurement range, frequency range, temperature range, sample thickness and compatibility with foods/semi-solids and liquids.

Various samples of comminuted muscle are prepared to have moisture and salt contents representative of commercial products (e.g. 74–84% moisture content and 1–3% salt content for surimi seafoods). Three different moisture and salt content values covering both ends of these ranges and a mid-range value are chosen for the samples. A minimum of four replications of each muscle food type and preparation are tested with each dielectric probe for a total of 12 test cases for each muscle food type or preparation. Different groups of 4 replicated samples are prepared in advance to be compatible with one of the three dielectric probes. In addition to the "macroscopic" samples making up commercial food products, properties are evaluated on such individual constituents as starch, water, and sugar. These find application in later stochastic food models.

The frequency range has been chosen to cover the typical industrial capacitive heating range (300 kHz to 100 MHz) as well as the lower frequencies (down to 100 Hz) to determine DC electrical conductivity. This range also identifies Debye resonance locations of the packaging materials and very complex polar sidechains in the food (e.g. protein molecules-peptide chains with amino acid residues in the side groups). The temperature range has been chosen to overlap the likely pasteurization temperature range of 20° C. to 85° C.

Impedance is measured on the samples (both shunt resistance and capacitance) and then electric permittivity $\epsilon'$, permittivity loss factor $\epsilon''$ and electrical conductivity $\sigma$ is calculated based on the material thickness, test fixture calibration factors (Hewlett Packard. 1995. *Measuring the Dielectric Constant of Solid Materials-HP 4194A Impedance/Gain-Phase Analyzer*. Hewlett Packard Application Note 339-13.) and swept frequency data. For details on the technical background covering the dielectric properties of foods including Debye resonances, please refer to the following discussion for Example 2. The data are summarized, plotted and tabulated in a form useable for follow-on research and development of capacitive dielectric heating systems for the thermal processing of comminuted muscle foods.

EXAMPLE 2

A mathematical model and computer simulation program can model and predict the capacitive heating performance of packaged comminuted muscle foods based on the characterized dielectric properties.

There are underlying mathematical models that form the basis of the overall simulation. The electric permittivity has been classically modeled using Debye equations (Barber, H. 1983. *Electroheal*. London: Granada Publishing Limited; Metaxas, A. C. and Meredith, R. J. 1983. In *Industrial Microwave Heating*. Peter Peregrinus Ltd.; Metaxas, A. C. and Meredith, R. J. 1983. In *Industrial Microwave Heating*. Peter Peregrinus Ltd.; and Ramo, S., J. R. Whinnery, and T. Van Duzer. 1994. *Fields and Waves in Communications Electronic*, $3^{rd}$ edition. New York: John Wiley & Sons, Inc.). These equations can be used to model a variety of relaxation processes associated with dielectric alignments or shifts in response to external varying electric fields. Each of these alignment processes has a corresponding relaxation time $T_0$ that is a function of several parameters of the atomic and molecular makeup of a medium, and therefore is a measure of the highest frequency for which these phenomena can occur. At a frequency which equals $\frac{1}{2}\pi T_0$, a Debye Resonance occurs which results in a peak in the loss factor $\epsilon''$. A model for the permittivity using a Debye function for a single relaxation process is shown in Equation (5):

$$\varepsilon = \varepsilon_0\left[\varepsilon_\infty + \frac{\varepsilon_d - \varepsilon_\infty}{1 + j\omega T_0}\right] \quad (5)$$

where $\epsilon_d$=Low Frequency Dielectric Constant of a Medium (f<<Debye Resonance).

$\epsilon_\infty$=High Frequency Dielectric Constant of a Medium (f>>Debye Resonance).

$\epsilon_0$=Permittivity of Free Space (8.854e-12 F/m).

Therefore, from Equation (1) it can be shown that the real and imaginary components of the permittivity are given for a single Debye resonance as follows:

$$\varepsilon' = \varepsilon_0\left[\varepsilon_\infty + \frac{\varepsilon_d - \varepsilon_\infty}{1 + \omega^2 T_0^2}\right] \quad (6)$$

$$\varepsilon'' = \frac{\omega T_0 \varepsilon_0 (\varepsilon_d - \varepsilon_\infty)}{1 + \omega^2 T_0^2} \quad (7)$$

$\epsilon_d$ is typically an order of magnitude or more larger than $\epsilon_\infty$, and so from inspection of equations (6) and (7), it is seen that in the vicinity of a Debye resonance, $\epsilon'$ drops off rapidly and there is a peak in the loss factor $\epsilon''$. When a composite medium containing multiple relaxation times exists, then the more general purpose model can be represented as a summation of Debye terms as given by Equation (8) (loss term only) (Metaxas and Meredith, 1983):

$$\varepsilon'' = \sum_{\tau=\tau_0}^{\tau_n} g(\tau)\left(\frac{\omega\tau}{1+\omega^2\tau^2}\right)\Delta\tau \quad (8)$$

where $g(\tau)$ is the fraction of orientation polarization processes in each interval $\Delta\tau$.

This summation assumes a linear combination of polarizations or Debye resonances. More complex mathematical models also exist for multiple Debye resonances if linearity is not assumed, and for complex composite dielectric materials with varying geometrical arrangements of the constituents (Neelakanta, P. S. 1995. *Handbook of Electromagnetic Materials. Monolithic and Composite Versions and Their Applications*. New York: CRC Press). In the case of heterogeneous foods, stochastic variables need to be included to model the relative concentrations and spatial distributions of the various constituents, and a Monte Carlo analysis performed to determine the statistical composite dielectric behavior in each block of a 3-D finite element partitioning model of the medium.

It can be shown (Roussy, G., J. A. Pearce. 1995. *Foundations and Industrial Applications of Microwaves and Radio Frequency Fields. Physical and Chemical Processes*. New York: John Wiley & Sons; Barber, 1983; Metaxus and Meredith, 1983) that the maximum power per unit volume ($P_v$) delivered to a medium for a given electric field intensity is represented by the following:

$$P_v = Q_{gen} = (\omega \epsilon'' + \sigma)|E|^2 \quad (9)$$

This reduces to the following when $\omega \epsilon'' >> \sigma$:

$$Q_{gen}(x,y,z,t) = P_v = E^2 \omega \epsilon'' \quad (10)$$

where E is again the RMS value of the electric field intensity. So for a given electric field intensity, peaks in the permittivity loss factor $\epsilon''$ results in peaks in the energy imparted to a medium, resulting in more efficient and rapid heating. Assuming for the moment that there is no heat transfer into or out of a medium due to convection or conduction, the heating time $t_h$ for a given temperature rise ($\Delta T$) due to dielectric heating is then given by Equation (11) (Orfeuil, 1987):

$$t_h = \frac{C_P \rho \Delta T}{E^2 \omega \varepsilon''} = \frac{C_P \rho \Delta T}{P_V} \quad (11)$$

where $C_p$=Specific Heat of the Medium (J/Kg ° C.)

p=Density of Medium (Kg/m$^3$)

and all the other parameters are as previously defined.

The more general purpose conservation of energy equation that accounts for heat transfer (convection or conduction from adjacent areas) and heat generation (dielectric heating source term) is given as follows (Roussy and Pearce, 1995):

$$\rho C_P \frac{\partial T}{\partial t} - \nabla \cdot (k_T \nabla T) = Q_{gen}(x, y, z, t) \quad (12)$$

where $K_T$=thermal conductivity of the medium and t=time; all other parameters are as previously defined.

In a similar fashion, the general purpose governing equation solving for the electric field (from Maxwell's equations in differential form) is as follows (Roussy and Pearce, 1995):

$$\nabla^2 V - \mu \varepsilon \frac{\partial^2 V}{\partial t^2} = -\frac{\rho_v}{\varepsilon} \quad (13)$$

where $P_v$=Charge Density; V=Electric Potential or Voltage Equation (13) reduces to the following when the medium is a passive source-less medium such as food and when the frequency of operation is low enough where the wavelength is long compared to sample dimensions such as in the case of capacitive heating (i.e. quasi-static model):

$$\nabla^2 V = 0 \quad (14)$$

The electric field is related to the voltage by the following equation:

$$E = -\nabla V \quad (15)$$

Or simply stated, the electric field is the negative gradient of voltage in three dimensions.

Equations (8), (9), (12), (14) and (15) form the basis for an electromagnetic dielectric heating model which can be applied to a composite dielectric model, to model a food substance having several subconstituents.

In addition, it is possible to make a composite series model for a food sample sandwiched top-and-bottom by a packaging layer, an air or water layer, and electrodes. From earlier discussion it is apparent that the dielectric parameters are all functions of temperature and frequency. It is also true from Equations (9) and (10) that the power generated for heating is a function of the dielectric loss factor and electric field intensity. Finally it can be deduced from Equations (13)–(15) that the electric field intensity is a function of the dielectric parameters which in turn are functions of temperature and frequency. Therefore an iterative solving algorithm can be developed to solve for all the desired parameters in this model, one that also sequences in time, cycling back and forth between the electromagnetic and thermal solutions and solves them as a function of frequency.

There are several options for developing a simulation model. One is to adapt existing electromagnetic models developed in MathCAD and MATLAB. Another is to employ various examples of electromagnetic field FEM programs for complex composite geometrical structures, such as the High Frequency Structure Simulator (HFSS) and the Maxwell Extractor electromagnetic field solver programs developed by Ansoft, Inc. of Pittsburgh, PA and Hewlett Packard. HeatWave Drying Systems, Ltd., working with Dr. W. Hoefer at the University of Victoria, has developed a third approach to solve for both the electromagnetic and thermal processes (Herring, J. L., W. J. Hoefer, and R. L. Zwick. 1995. TLM Modeling of a RF/Vacuum Wood Drying Kiln. Progress in Electromagnetic Research Symposium. Seattle, Wash.). One can start with this 3-D FEM HFSS electromagnetic field solver which has already been combined with heat transfer simulation models to address the RF wood drying process. Findings on Debye resonances both with the food samples of interest, and on stochastic models representing the heterogeneous spatial distribution of constituents within a food volume, can then be incorporated. Thus, the initial model work leverages off of models already developed by HeatWave and their collaborators.

EXAMPLE 3

Thermal and non thermal effects of radio-frequency pasteurization on microbiological lethality, color, and texture in representative comminuted muscle foods are quantified.

Sample preparation.

Two types of comminuted muscle samples are investigated: beef frankfurter and surimi seafood. Since all food ingredients mixed into samples contribute to every aspect of quality issues, to include microbiology, sensory, and physical properties, a commercial formulation for both samples are developed. The formulation is adjusted to maintain 75% moisture and 1.65% salt. Overall chopping procedures are based on the teachings in Yongsawatdigul, J., Park, J. W., Kolbe, E., AbuDagga, Y. and Morrissey, M. T. 1995, Ohmic heating maximizes gel functionality of Pacific whiting surimi. J. Food Sci. 60:10–14.

Pasteurization/Heating method.

Paste is prepared and stuffed into stainless steel tubes (1.9 cm I.D.×17.5 cm long). Initial heating is conducted in a 90° C. water bath until internal temperature reaches 70° C. At this temperature, fish myosin and actin complete denaturation and gelation (Oakenfull, D. G. 1996. Gelation mechanisms. Foods and Food Ingredients J. Japan. 167:48–68). Initial cooking for beef franks is suggested at 155° F. (68.2° C.) for 30 min (Hanson, R. 1995. Design and function of batch meat processing ovens. A textbook of Viskase and AMSA Meat Science School. August 16–18. Chicago, Ill.). Therefore, it is assumed that this process mimics initial cooking in the commercial processing of surimi seafood and beef franks.

Cooked gels, without chilling, are removed from the tubes and vacuum-packaged in plastic bags for various thermal treatments for pasteurization. Pasteurization is conducted in the radio frequency heating device located at the laboratory of HeatWave. Heating at the same rates under a range of frequencies enables measurement of the nonthermal effects of RF on aerobic plate counts (APC). As a control, a sample is heated in a water bath (90° C.) for 60 min. Each heat treatment is repeated three times. Changes of internal temperatures as a function of time are monitored using a 21 X data logger (Campbell Scientific, Logan, Utah) in the water bath heater; and by fiber-optic sensors in the RF lab at HeatWave.

Microbiological assay.

Raw paste, initial cooked gels, and pasteurized gels are aseptically collected for aerobic plate count (APC). The microbial assay are conducted by spread-plating on tryptone-peptone-yeast extract (TPE) agar and incubated at 30° C. for 48 hr (Lee, J. S. and Howard, L. A. 1970. Comparison of two procedures for enumeration of microorganisms from frozen foods. J. Milk and Food Technol. 33:237–239).

Textural properties.

Longer time and higher temperature cooking generally causes textural destruction especially in surimi seafood products made with reduced surimi content and higher starch content. Changes of textural properties are monitored as shear stress and shear strain using a torsion test (NFI. 1991. *A Manual of Standard Methods for Measuring and Specifying the Properties of Surimi*, T. C. Lanier, K. Hart, and R. E. Martin (Ed.), National Fisheries Institute, Washington, DC). Shear stress denotes gel strength, while shear strain indicates the cohesive nature of gels.

Color properties.

Longer time and higher temperature cooking causes discoloration (development of yellow hue) especially when some protein additives and sugar are present. Color properties (L*, a*, b*) of gels are measured using a Minolta chroma meter (Minolta USA, Ramsey, N.J.).

Non-thermal killing effects by radio frequency.

Microbial (APC) destruction and temperature profiles when heated at various radio frequencies are monitored. Identical temperature profiles are applied to sample paste using water bath and microbial destruction by thermal treatment is calculated. Difference between the two measurements is used as non-thermal kills Model study A pasteurization method for the maximum thermal treatment is selected for the model study. *Enterococcus faecium* is selected as the target organism because of its high thermal resistance in sous vide products (Ghazala, S. Coxworthy, D., and Alkanani, T. 1995. Thermal kinetics of *Sireplococcus faecium* in nutrient broth sous vide products under pasteurization conditions. J. Food Processing and Preservation 19:243–257; Magnus, C. A., McCurdy, A. R., and Ingledew, W. M. 1988. Further studies on the thermal resistance of *Streptococcus faecium* and *Streptococcus faecalis* in pasteurized ham. Can. Inst. Food Sci. Technol. J. 21:209–212). The stock culture for *Enteroccocus faecium* is revived in cooked meat broth for 24 hr at 37° C., plated on Difco trypticase soy agar (TSA) and incubated for 24 hr at 37° C. These plates are maintained at 1° C. An overnight culture is prepared in a cooked meat broth (pH 7.23, 0.5% NaCl) and incubated at 37° C. for 20 hr so that the cell concentration is 107–108 CFU/ml. Surimi and frankfurter paste are inoculated with the culture and homogenized before the heat treatment. Enumeration follows dilution and plating as described by (Ghazala et al., 1995).

Thermal inactivation trials are performed at each temperature (30, 45, 60, 75, 90° C.) in triplicate. The D-value of *E. faecium* at each trial temperature is determined from a plot of the logarithm of microbial survivors versus heating time. The z-value is obtained by plotting the logarithm of D-values versus heating temperatures (thermal death time, TDT plot). Quattro Pro software is used to determine slope, intercept, and $r^2$ values using least square linear regression analysis.

Pasteurization values represent the minimum number of minutes at a specific temperature which is required for the product's coldest point to receive about 13–14 times the decimal reduction of a target organism (Ghazala, S. and Aucoin, E. J. 1996, Optimization of pasteurization processes for a sous vide product in rectangular thin profile forms. J. Food Quality 19:203–215). Pasteurization values are determined by Ball's equation (Ball, C. O. and Olson, F. C. W. 1957, In *Sterilization in Food Technology*, pp. 291, 353, 356, McGraw-Hill Book Co., New York, N.Y.), while cooking values are determined by Mansfield equation (Mansfield, T. 1962, High-temperature short-time sterilization, Proc. 1st Int. Cong. Food Sci. & Tech. Vol 4, Gordon and Breach, London, UK) as follows:

$$\text{Pasteurization value} = P_v = \int_0^t 10^{\frac{(T-T_{ref})}{Z}} dt \qquad (16)$$

$$\text{Cook value} = C_v = \int_0^t 10^{\frac{(T-T_{ref})}{Z_c}} dt \qquad (17)$$

where $P_v$=Integrated pasteurization value at the point of slowest heating $C_v$=Integrated cooking value at the point of slowest heating t=Processing time, min T=Temperature at time t, ° C.

$T_{ref}$=Reference temperature (85° C.)

z=Slope of the logarithm of the decimal reduction time versus temperature for a specified organism, ° C.

$z_c$=z-value for degradation of quality of a specified quality factor, e.g. texture and color.

The pasteurization value and cook value are determined using Eq. (16) and (17) employing z-value for *Enterococcus faecium* and a reference pasteurization temperature. Thermal kinetics of *Enterococcus faecium* are calculated.

EXAMPLE 4

High energy density capacitive heating experiments can be conducted on various packaged comminuted muscle foods, validating the computer simulation model, testing pasteurization efficacy, testing the effects of electromagnetic energy on food quality, and verifying suitable packaging materials. For example, such testing can be performed in a capacitive heating test facility such as that of HeatWave Drying Systems, Ltd. located on the campus of the University of British Columbia in Vancouver, BC, Canada.

At the HeatWave facility, the processed food samples can be analyzed (for textural changes and pasteurization efficacy). The packaging materials are analyzed for sensitivity to RF energy. The heating vs. time results are analyzed to validate the computer simulation model and to make any necessary adjustments to the model, based on those results. Exact quantities of samples and replication numbers, as well as exact RF power levels and other Example 4 experimental details are determined based on the results of Examples 1–3.

The various media under test are heated at frequencies in the range 1 MHz–100 MHz based on the information gained in Example 1. There are two test scenarios as shown below. The first is a general test over a semi-logarithmic distribution of frequencies. The second concentrates on Debye resonances that may have been identified from Example 1. Other tests experiment, for example, with results of controlled/constant field strength; voltage gradient can vary with tested sample thickness. In all cases, the food package dimensions can be varied—from single, relatively thin package to a stack representing a load up to 24 cm in thickness. Electrode dimensions and shape can be modified in the heating system. For all cases, thermal sensors are placed in the media under test to determine temperature rise and distribution.

Test 1: General Purpose Frequency Sweep:

| Frequencies* | Test Power Levels (Max. Output) | Inoculated (Y/N) | Number of Replications* | Food Type |
|---|---|---|---|---|
| 1–100 MHz | 200W, 2KW | Y | 4 | Surimi Seafood |
| 1–100 MHz | 200W, 2KW | Y | 4 | Frankfurters |
| 1–100 MHz | 200W, 2KW | N | 4 | Surimi Seafood |
| 1–100 MHz | 200W, 2KW | N | 4 | Frankfurters |
| 1–100 MHz | 200W, 2KW | N | 4 | Packaging only |

*Samples are prepared and tested for each of the following frequencies in the general sweep test: 1, 2, 3, 5, 7, 10, 20, 30, 50, 70, 100 MHz Test 2: Debye Resonance Search In this test, the frequency of the capacitive heater is set at the location of any Debye resonances that were identified by the results in Example 1. The power level is set first to a low level (100W) for the first set of samples and the frequency swept gradually to both scarch for the resonance and to test for its dependence on temperature. Once Debye resonances are located at 100W, the system is adjusted to 2 KW and the Debye resonance experiment repeated on a different set of replicated samples with the temperature rise measured.

There are several potential manufacturing process flow applications of this technology in the food industry. These are shown in FIG. 8 in schematic form. The four manufacturing process flows shown in FIG. 8 could represent the following types of process applications:

A. Capacitive (RF) dielectric heating of a mixed particulate slurry (e.g. diced vegetables in soup) where the device can be tuned to preferentially or selectively heat the particulate material by targeting its Debye resonances. Conversely, the device may be tuned to preferentially or selectively heat the formulated carrier medium by targeting its Debyc resonances instead.

B. Capacitive (RF) dielectric heating of foods within a package (e.g. pasteurization of packaged Surimi seafoods) where a medium can be heated even though it has already been packaged within a electrical and thermal insulator.

C. Capacitive (RF) dielectric heating action targeted toward in-situ surrounding micro-environment of packaged products. In such cases, secondary influences motivated by and resulting from RF interaction with in-package atmosphere (e.g. elemental gases, gaseous molecular compounds, aerosols, liquids and/or fluids) result in the generation of quality enhancing, preserving and/or pasteurization effects.

D. Elicitation of live culture with RF energy to stimulate production of cellular biomass, intra- or extra-cellular metabolites, and/or fermentation products.

EXAMPLE 5

Capacitive (RF) dielectric heating apparatus of the type shown in FIG. 1 will be used to sterilize and/or pasteurize seeds. These will include but not be limited to radish, alfalfa and carrot seeds. Most particularly, the apparatus will be used to sterilize and/or pasteurize seeds that are suspended in an edible film packaging material, a non-edible standard film packaging material or other sealed container. Seeds not encased in a packaging material or sealed container also will be sterilized and/or pasteurized by capacitive (RF) dielectric heating. Using such methods, it will be possible to sterilize and/or pasteurize seeds that are destined for sprout products in foods.

The capacitive (RF) dielectric heating apparatus will also be used to sterilize and/or pasteurize sprouted seed products after seeds have germinated. The sprouts may be in sealed packaging material, sealed containers, or unsealed containers.

The various seed and sprout products may have optimum "Debye resonances" or frequencies where capacitive (RF) dielectric heating will be the most efficient. The capacitive (RF) dielectric heating system will target those optimum frequencies. These possible "Debye resonances" in seeds and sprout products will have particular temperature dependencies. The capacitive (RF) dielectric heating system will be designed to track those temperature dependencies during heating as the temperature rises. The various seed and sprout products may have other "optimum" frequencies that are not necessarily "Debye" resonances but are still proven to be important frequencies for achieving various desired benefits in either the seeds or sprouts or plants growing from the seeds. The capacitive (RF) dielectric heating system will be capable of targeting those frequencies and tracking any of their temperature dependencies.

Target micro-organisms or agents also may have "Debye" resonances or other non Debye optimum frequencies that are proven to be especially effective in achieving selective killing performance of the organisms without adversely affecting the seeds that the organisms reside on any packaging materials that may be used. The capacitive (RF) dielectric heating system will be capable of targeting those optimum frequencies and tracking them with temperature to achieve selective control of those organisms. In general various microscopic pathogens (microbial organisms, fungal spores, etc.) as well as macroscopic pests (e.g. insects, insect larvae, etc.) may have "Debye" resonances or other non Debye optimum frequencies that are proven to be especially effective in achieving selective killing performance of the organisms to allow for the broad use or application of the above-described capacitive (RF) dielectric heating technologies. The capacitive (RF) dielectric heating system will be designed to accommodate these optimum frequencies and track them with temperature in a broad arrangement of commercial, industrial, laboratory and field implementations of the technology for use in the food, agriculture and medical industries.

Under normal circumstances the seeds will be packaged in edible and/or non-edible standard films which are invisible to the applied RF electric fields to insure that the packaging materials will not heat or burn or change any of their packaging performance qualities after exposure to the RF field. The packaging materials and corresponding capacitive (RF) dielectric heating system will be designed (including frequency selection) for such performance and compatibility.

Under special circumstances the seeds may be packaged in certain types of edible films that exhibit Debye resonances allowing for the heating of the packaging film and seeds simultaneously with a complex multi-frequency profile from the capacitive (RF) dielectric heating system. This would allow for supplementary heating of the seeds from the packaging material over and above the direct dielectric heating of the seeds themselves. The location of the Debye resonances in the films may be at much lower frequencies than those found in the seeds. The capacitive (RF) dielectric heating system will be designed to target the Debye resonances of both the edible film packaging materials and seed products either simultaneously or in a time-multiplexed manner that approximates simultaneous heating behavior. The frequency and heating profile would be designed to allow for the heating of the packaging materials and supplementary transfer of heat to the seeds without the destruction of the packaging materials.

Under special circumstances the seeds may be packaged in certain types of edible films that again exhibit Debye resonances to allow for the case where the heating of the seeds comes from the thermal heat transfer or conduction of heat from the heated packaging materials. This would allow for the capacitive (RF) dielectric heating of seeds indirectly even if the seeds were invisible to the direct effects of the applied field (i.e. they themselves don't exhibit Debye resonances in the frequency range of the equipment). The frequency and heating profile would be designed to allow for the heating of the packaging materials and transfer of heat to the seeds without the destruction of the packaging materials.

Edible film packaging materials will be chosen so as to allow for the complete isolation of seeds from external contaminating agents after being sterilized in the capacitive (RF) dielectric heating system. The films will be biodegradable and water soluble so as to naturally dissolve when planted to produce sprouts in either a sterile bed or hydroponic environment.

The capacitive (RF) dielectric heating system will be capable of use in heating applications to enhance seed germination effects. The system will heat for the purpose of killing germination inhibiting organisms as well as softening the hard encasing material of seeds to prepare for germination. The seeds will be either packaged in edible or non-edible packaging films or sealed containers or alternatively heated in non-sealed containers.

The capacitive (RF) dielectric heating system will be capable of use in heating applications to enhance growth and flowering performance and yield performance and disease and pest resistance along with other delayed enhancement effects of plants grown from seeds treated by the capacitive heating. The system will be capable of again targeting optimum frequencies (in this case not necessarily limited to Debye resonances), that have been proven to be successful in seed treatment processes to achieve the desired delayed effects that occur during the plant's growth stages.

The capacitive (RF) dielectric heating system will be designed such that there are no germination inhibiting effects from the sterilization or pasteurization processes for seeds. This will result from understanding the dielectric properties of seeds and heating at the optimum frequencies for enhancing microbial kill and germination and staying away from frequencies or exposure times that may inhibit seed germination.

The capacitive (RF) dielectric heating system will allow for various product geometries to handle the wide variation of packaged or unpackaged seed geometry variations. The capacitive (RF) dielectric heating system will have power control and voltage/electric field level control capabilities as well as potentially contain a gridded electrode arrangement (see FIGS. 6–7) to allow for precise control of the field strength vs. time and position in the heated sample. This will allow for the heating of small and large product geometries as well as composite and non-uniform product configurations to prevent arcing, burning and thermal runaway problems. This may be especially important for packaged seed products which may come in non-regular product geometries.

The capacitive (RF) dielectric heating system will be compatible with all of the existing production flow schemes described for meat and fish products and extend those industrial and production process capabilities where applicable to allow for the treatment of seeds.

The capacitive (RF) dielectric heating system will be designed in such a way as to be compatible with export sterilization and pasteurization processes that insure that quality foods are shipped abroad.

The capacitive (RF) dielectric heating technology will be developed so as to allow for household "counter top" solutions to allow for the home/kitchen broad based sterilization and pasteurization of all types of foods that consumers use. This solution will be a competitive product to microwave ovens but will operate at lower frequencies where electric field penetration is deeper and more uniform.

In addition to the above examples of various manufacturing process flows, there also exists the potential of using this technology in combination with other heating technologies to improve product quality, process productivity, and/or energy efficiency. Processes that might benefit from the superposition of RF exposure include liquid-solid and liquid-liquid extraction, miscella and phase separation, pressure and vacuum treatments, aeration, and the like.

It is to be understood that the present invention includes all such modifications as may come within the scope and spirit of the following claims and equivalents thereof.

What is claimed is:

1. A method for heating a food product, the method comprising:
    selecting an RF signal frequency not greater than 300 MHz to correspond to a Debye resonance frequency for a food product; and
    maintaining the food product in an AC electrical field provided by an RF signal at the selected frequency for a time sufficient to heat the food product.

2. The method of claim 1 wherein the RF signal frequency is in the range of 1 MHz–100 MHz.

3. The method of claim 1 further comprising varying the AC field strength and resulting current to regulate the heating.

4. The method of claim 1 further comprising:
sensing the temperature of the food product;
determining a Debye resonance frequency which corresponds to the most recently sensed temperature of the food product; and
as the food product increases in temperature, adjusting the RF frequency to match the Debye resonance frequency for the most recently sensed temperature.

5. The method of claim 1 comprising providing the RF signal at multiple RF frequencies which respectively correspond to Debye resonance frequencies of multiple components of the food product.

6. The method of claim 1 wherein:
the food product is contained in packaging material; and
the frequency of the RF signal is selected not to be a Debye resonance frequency of any component of the packaging material.

7. The method of claim 1 wherein:
the food product is contained in packaging material; and
the frequency of the RF signal is selected to be a Debye resonance frequency of a component of the packaging material.

8. The method of claim 1 wherein the food product is an unsprouted seed.

9. The method of claim 1 wherein the food product is a sprout.

10. A method for heating a food product comprising:
maintaining a food product in an AC electrical field provided by an RF signal at a resonance frequency of the food product;
sensing the temperature of the food product to produce a sensor output signal;
determining the resonance frequency which corresponds to the most recently sensed temperature by applying the sensor output signal to a computer which supplies resonance frequency vs. temperature information for the food product to produce a control signal output of the computer corresponding to the resonance frequency;
as the food product increases in temperature, adjusting the frequency of the RF signal by the control signal output of the computer to match the resonance frequency for the most recently sensed temperature.

11. The method of claim 10 comprising providing the RF signal at multiple RF frequencies which respectively correspond to Debye resonance frequencies of multiple components of the food product.

12. The method of claim 10 wherein:
the food product is contained in packaging material; and
the frequency of the RF signal is selected not to be a Debye resonance frequency of any component of the packaging material.

13. The method of claim 10 wherein:
the food product is contained in packaging material; and
the frequency of the RF signal is selected to be a Debye resonance frequency of a component of the packaging material.

14. A method for heating a food product, the method comprising:

maintaining a food product that is contained in packaging material in an AC electrical field provided by an RF signal at a frequency not greater than 300 MHz; and
selecting the RF signal frequency to correspond to a Debye resonance frequency for a component of the packaging material.

15. The method of claim 14 wherein the food product is an unsprouted seed.

16. The method of claim 14 wherein the food product is a sprout.

17. A method for heating a food product comprising:
maintaining a food product that is contained in packaging material in an AC electrical field provided by an RF signal at a resonance frequency of the packaging material;
sensing the temperature of the packaging material to produce a sensor output signal;
determining the resonance frequency which corresponds to the most recently sensed temperature by applying the sensor output signal to a computer which supplies resonance frequency vs. temperature information for the packaging material to produce a control signal output of the computer corresponding to the resonance frequency;
as the packaging material increases in temperature, adjusting the frequency of the RF signal by the control signal output of the computer to match the resonance frequency for the most recently sensed temperature.

18. A method for killing an undesired organism associated with a food product, the method comprising:
maintaining a food product in an AC electrical field provided by an RF signal at a frequency not greater than 300 MHz; and
selecting the RF signal frequency to correspond to a Debye resonance frequency for the organism.

19. A method for killing an undesired organism associated with a food product, the method comprising:
maintaining a food product in an AC electrical field provided by an RF signal at a resonance frequency of an undesired organism associated with a food product;
sensing the temperature of the food product to produce a sensor output signal;
determining the resonance frequency which corresponds to the most recently sensed temperature by applying the sensor output signal to a computer which supplies resonance frequency vs. temperature information for the organism to produce a control signal output of the computer corresponding to the resonance frequency;
as the food product increases in temperature, adjusting the frequency of the RF signal by the control signal output of the computer to match the resonance frequency for the most recently sensed temperature.

20. A method for heating a food product comprising:
testing a first sample of a food product to determine several different resonance frequencies of the food product, corresponding to several different temperatures;
storing the resulting resonance frequency vs. temperature information for the food product in memory of a computer;
flowing a signal through a second sample of the food product, the signal being at an RF frequency not greater than 300 MHz and being at a resonance frequency for the food product;

sensing the temperature of at least one portion of the second sample;

determining, by operation of the computer, the resonance frequency of the food product which corresponds to the most recently sensed temperature of the food product; and adjusting the frequency of the RF signal to match the resonance frequency determined for the most recently sensed temperature as the second sample increases in temperature.

21. A method for treating seeds, the method comprising:

maintaining seeds in an AC electrical field provided by an RF signal at a frequency not greater than 300 MHz; and selecting the RF signal frequency to correspond to a Debye resonance frequency for the seeds or to a resonance frequency for an undesired microorganism associated with the seeds.

* * * * *

UNITED STATES PATENT AND TRADEMARK OFFICE
CERTIFICATE OF CORRECTION

PATENT NO. : 6,303,166 B1
DATED : October 16, 2001
INVENTOR(S) : Kolbe et al.

It is certified that error appears in the above-identified patent and that said Letters Patent is hereby corrected as shown below:

Title page,
References Cited, OTHER PUBLICATIONS, "Sadha News" should read -- SADHA News --.
*Attorney, Agent, or Firm,* "Karlquist Sparkman, LLP" should read -- Klarquist Sparkman, LLP --

Column 2,
Line 55, "teclmologies" should read -- technologies --.

Column 5,
Line 10, "the melt" should read -- melt --.
Line 23, "separa te seve ral" should read -- separate several --.
Line 30, "plaed" should read -- placed --.

Column 10,
Line 56, "possible" should read -- possibly --.

Column 14,
Line 13, "Electroheal" should read -- Electroheat --.

Column 15,
Line 26, "x,y,z,t" should read -- $x,y,z,t$ --.
Line 44 "p" should be the Greek letter -- $\rho$ --.
Line 65, "P" should be, in italics, the Greek letter -- $\rho$ --.

Column 18,
Line 3, "*Sireplococcus*" should read -- *Streptococcus* --.
Line 25, "valucs" should read -- values --.

Column 19,
Line 55, "scarch" should read -- search --.

UNITED STATES PATENT AND TRADEMARK OFFICE
CERTIFICATE OF CORRECTION

PATENT NO. : 6,303,166 B1
DATED : October 16, 2001
INVENTOR(S) : Kolbe et al.

It is certified that error appears in the above-identified patent and that said Letters Patent is hereby corrected as shown below:

Column 20,
Line 4, "Debyc" should read -- Debye --.
Line 8, "a electrical" should read -- an electrical --.

Signed and Sealed this

Twenty-third Day of April, 2002

Attest:

JAMES E. ROGAN
*Attesting Officer*   *Director of the United States Patent and Trademark Office*